United States Patent
Mashimo (10) Patent No.: US 9,871,561 B2
(45) Date of Patent: Jan. 16, 2018

(54) COMMUNICATION APPARATUS, CONTROL METHOD OF COMMUNICATION APPARATUS, AND PROGRAM

(71) Applicant: CANON KABUSHIKI KAISHA, Tokyo (JP)

(72) Inventor: Hiroshi Mashimo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 486 days.

(21) Appl. No.: 14/558,518

(22) Filed: Dec. 2, 2014

(65) Prior Publication Data

US 2015/0155746 A1 Jun. 4, 2015

(30) Foreign Application Priority Data

Dec. 4, 2013 (JP) .................. 2013-251391

(51) Int. Cl.
*H04B 5/00* (2006.01)

(52) U.S. Cl.
CPC ......... *H04B 5/0037* (2013.01); *H04B 5/0031* (2013.01); *H04B 5/0075* (2013.01)

(58) Field of Classification Search
CPC .................................................. H04B 5/0037
USPC ........................................................ 307/104
See application file for complete search history.

(56) References Cited

U.S. PATENT DOCUMENTS

2012/0212071 A1* 8/2012 Miyabayashi ....... H04B 5/0037
307/104

FOREIGN PATENT DOCUMENTS

JP 2013-530668 A 7/2013

* cited by examiner

*Primary Examiner* — Joseph Chang
(74) *Attorney, Agent, or Firm* — Canon U.S.A., Inc. IP Division (57) ABSTRACT

A communication apparatus includes an electric power reception unit that receives electric power wirelessly supplied from another apparatus, a notification unit that provides notification of capability information of the communication apparatus by wireless communication, and a control unit that controls the notification unit to switch from providing notification of a first capability information not including information indicating capability to receive electric power wirelessly supplied, to providing notification of an information capability information including information indicating capability to receive electric power wirelessly supplied, in accordance with reception of electric power by the electric power reception unit.

14 Claims, 9 Drawing Sheets

COMMUNICATION APPARATUS, CONTROL METHOD OF COMMUNICATION APPARATUS, AND PROGRAM

BACKGROUND

Field

Aspects of the present invention generally relate to a wireless communication apparatus that notifies information of itself.

Description of the Related Art

Bluetooth® Low Energy (hereinafter, "BLE") is a communication format for performing wireless communication. BLE stipulates that the data portion of advertise packets which notify wireless devices situated in the vicinity of information of itself is selectable from 0 to 32 bytes. There also has been proposed a technique to use information communication among apparatuses in wireless power transmission, using Bluetooth® technology (PCT Japanese Translation Patent Publication No. 2013-530668).

In a case of notifying wireless devices situated in the vicinity of information of itself using BLE, there may be cases where all services and profiles which the self apparatus is compatible with may not be included, since there is the aforementioned limit on the data capacity of advertise packets.

Assuming application of BLE to exchange of control information among apparatuses in wireless power transmission such as described in PCT Japanese Translation Patent Publication No. 2013-530668, the following situation may occur. That is to say, if service information indicating that the communication apparatus is compatible with wireless power transmission is always input to advertise packets and notified, notification of services and profiles other than regarding wireless power transmission cannot be notified. Thus, services other than wireless power transmission may not be able to be quickly started with other apparatuses. On the other hand, if service information indicating compatibility with wireless power transmission is not input to advertise packets, wireless power transmission cannot be quickly performed with other apparatuses with which wireless power transmission is to be performed.

SUMMARY

According to an aspect of the present invention, a communication apparatus includes an electric power reception unit configured to receive electric power wirelessly supplied from another apparatus, a notification unit configured to provide notification of capability information of the communication apparatus by wireless communication, and a control unit configured to control the notification unit to switch from providing notification of a first capability information not including information indicating capability to receive electric power wirelessly supplied, to providing notification of an information capability information including information indicating capability to receive electric power wirelessly supplied, in accordance with reception of electric power by the electric power reception unit.

Further features of the present disclosure will become apparent from the following description of exemplary embodiments with reference to the attached drawings.

DESCRIPTION OF THE EMBODIMENTS

The following embodiment addresses issues related a power receiving apparatus notifying service information. Specifically, a power receiving apparatus switches service information to be notified, depending on whether power can be supplied from a power transmitting apparatus, or otherwise. Accordingly, the power receiving apparatus adaptively switches notified services according to power reception state.

First Embodiment

The present embodiment is configured including a charging stand which performs wireless power transmission, and a camera having wireless power reception capabilities. Operations carried out at the time of the camera receiving power from the charging stand will be described.

Figure 1:
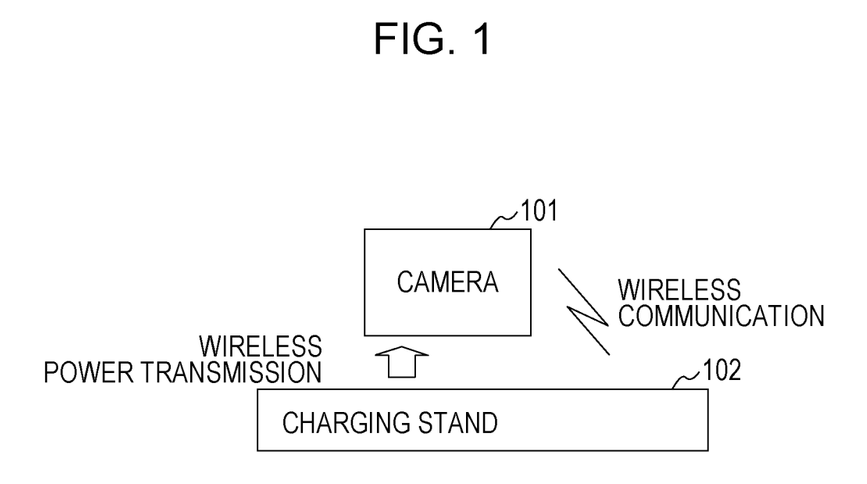
FIG. 1 illustrates connection between a camera and charging stand according to a first embodiment.

This configuration according to the present embodiment is illustrated in FIG. 1. A camera 101 has wireless communication functions using BLE, and exchanges information relating to wireless power transmission with a charging stand 102 using the wireless communication functions. The charging stand 102 has wireless communication functions using BLE and also has wireless power transmission functions. The power stand 102 exchanges information relating to wireless power transmission with a power receiving apparatus placed thereupon.

Figure 2:
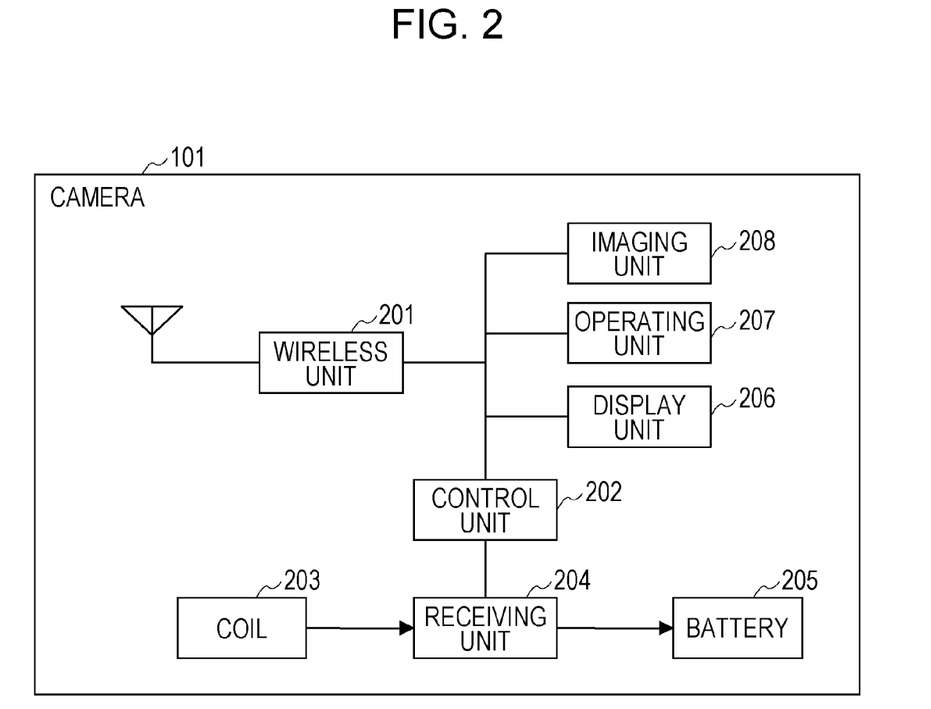
FIG. 2 illustrates the configuration of the camera according to the first embodiment.

FIG. 2 illustrates the configuration of the camera 101. The camera 101 includes a wireless unit 201, a control unit 202, a coil 203, a receiving unit 204, a battery 205, a display unit 206, an operating unit 207, and an imaging unit 208. The wireless unit 201 in FIG. 2 has a wireless chip which is BLE-compatible, and an antenna capable of 2.4 GHz communication, and performs BLE-compliant wireless communication. The wireless unit 201 transmits advertise packets as stipulated in the BLE standard to notify other communication apparatuses in the vicinity of the services which the camera 101 has.

The control unit 202 includes a central processing unit (CPU) and memory. The control unit 202 controls the overall camera 101 by the CPU executing control programs stored in the memory, so as to control the hard ware components and to calculate and modify information. The control unit 202 sets service information and profiles, which the self apparatus corresponds to, to be input to advertise packets. The control unit 202 also generates and saves data transmission/reception signals, and power control including switching of power and so forth.

The coil 203 is an antenna for wirelessly receiving power, which is performed by magnetic resonance or magnetic inductance. The receiving unit 204 receives power induced at the coil 203 based on an electromagnetic field (electromagnetic waves) from the charging stand. The receiving unit 204 also detects whether or not power has been received by the coil 203. The receiving unit 204 further rectifies the high-frequency power that has been received and converts into DC power. Note that in a case where the receiving unit 204 cannot operate the control unit 202 and wireless unit 201 by the power from the battery 205 and cannot start communication to receive power, the receiving unit 204 supplies power to the control unit 202 and wireless unit 201 alone, so as to perform communication with the charging stand 102. The battery 205 is a power source to supply power to each block within the camera 101. The battery 205 is charged by power generated by the receiving unit 204, and thus stores electricity. The remaining power of the battery 205 can be read out by the control unit 202.

The display unit 206 is a display unit which performs various types of display, and has functions to output information which can be visually recognized, such as by a liquid crystal display (LCD) or light-emitting diode (LED), or sound output by speakers or the like. The display unit 206 has functions to output at least one of visual information and sound information. The display unit 206 has video random access memory (VRAM) which holds image data corresponding to the visual information to be displayed. The display unit 206 performs display control, to continue display of image data stored in the VRAM, on the LCD or LEDs. The display unit 206 displays images imaged by the imaging unit 208, and displays images, setting information, and remaining power of the battery, saved in the memory of the control unit 202. The display unit 206 also displays the state of charging.

The operating unit 207 is an operating unit by which the user performs various types of input to operate the communication apparatus. The operating unit 207 stores flags corresponding to input in memory. The operating unit 207 is an input device for performing settings regarding imaging and playback, camera settings, and wireless settings, and is made up of buttons, dials, a touch panel, or the like. The imaging unit 208 performs imaging of images. The imaging unit 208 is configured including a lens, an area sensor, an image processing circuit, and so forth. Images imaged by the imaging unit 208 are saved in them memory within the control unit 202.

Figure 3:
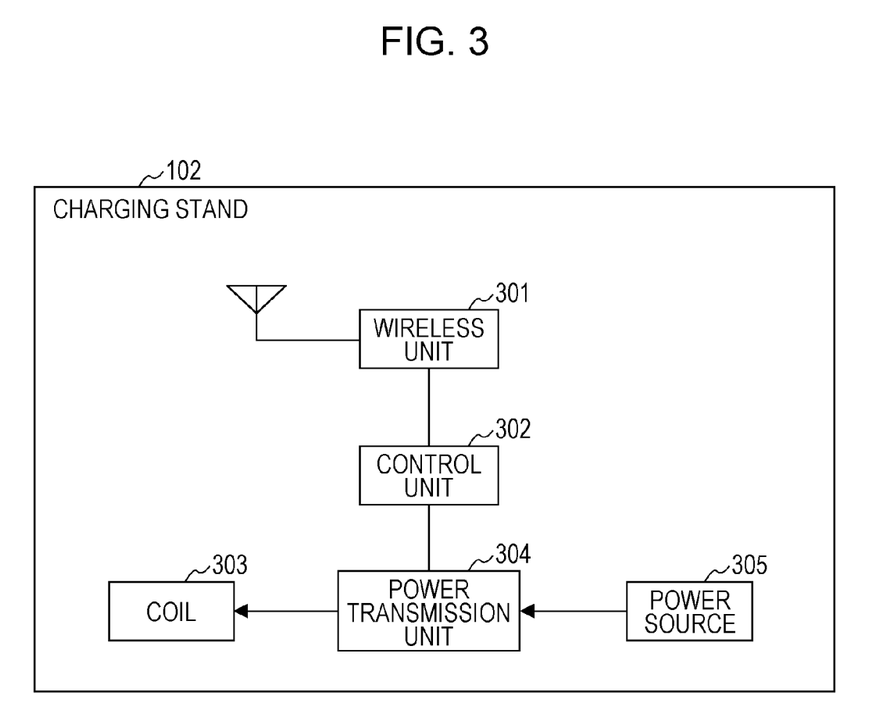
FIG. 3 illustrates the configuration of the charging stand.

FIG. 3 illustrates the configuration of the charging stand 102. The charging stand 102 includes a wireless unit 301, a control unit 302, a coil 303, a power transmission unit 304, and a power source 305. The wireless unit 301 has a wireless chip which is BLE-compatible, and an antenna capable of 2.4 GHz communication, and performs BLE-compliant wireless communication. The wireless unit 301 receives notification signals, i.e., advertise packets, notified by other communication apparatuses in the vicinity. Upon having received advertise packets including service information corresponding to the wireless power transmission format of the self apparatus from another apparatus, the charging stand 102 connects to this other apparatus. The power source 305 acquires operating power from a commercial power source. An arrangement may be made where the wireless unit 301 makes notification by advise packets that the self apparatus is compatible with the wireless power transmission service.

Figure 5:
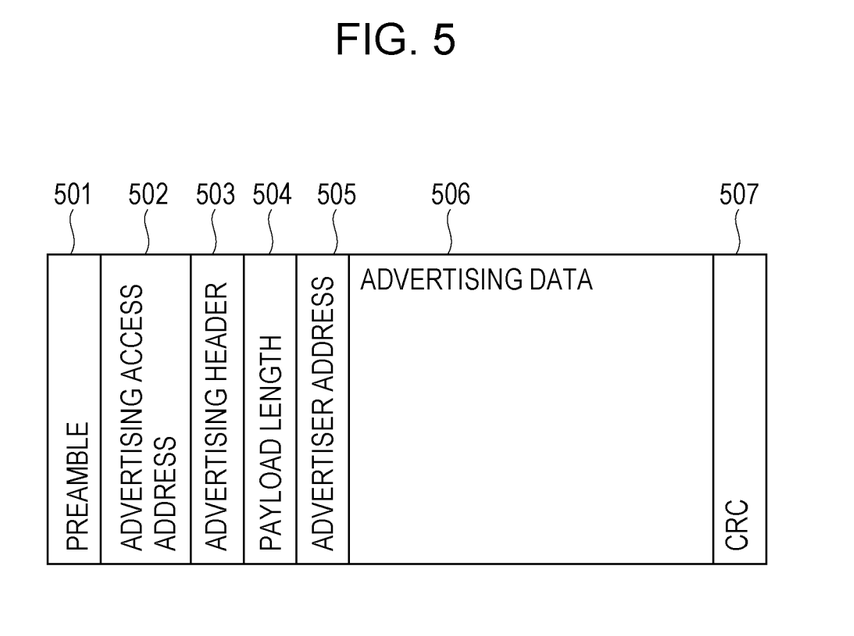
FIG. 5 illustrates the configuration of an advertise packet.

The configuration of advertise packets notified by the wireless unit 201 of the camera 101 will be described with reference to FIG. 5. An advertise packet is configured including a preamble 501, an access address 502, an advertising header 503, a payload length 504, an advertiser address 505, advertising data 506, and a cyclic redundancy check (CRC) 507. The preamble 501 is used to detect packets and synchronize reception timing. The access address 502 indicates the type of packet. In a case of indicating an advertise packet, a fixed value is input to the access address 502. The advertising header 503 indicates the type of advertise packet. The payload length 504 indicates the data size of the payload. The advertiser address 505 indicates the transmission source. The advertising data 506 can be set to a range of 0 to 32 bytes, with data relating to service information and profiles of the self apparatus being input. The CRC 507 is data for error detection.

Figure 6:
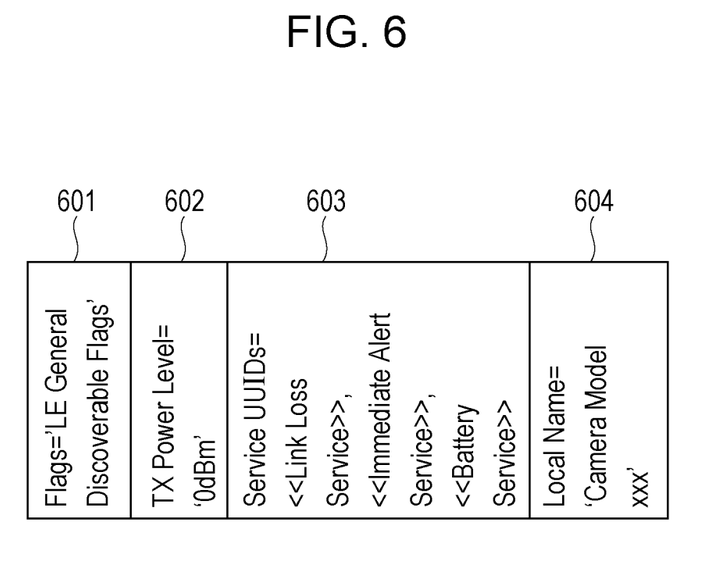
FIG. 6 illustrates the configuration of advertise data.
Figure 8:
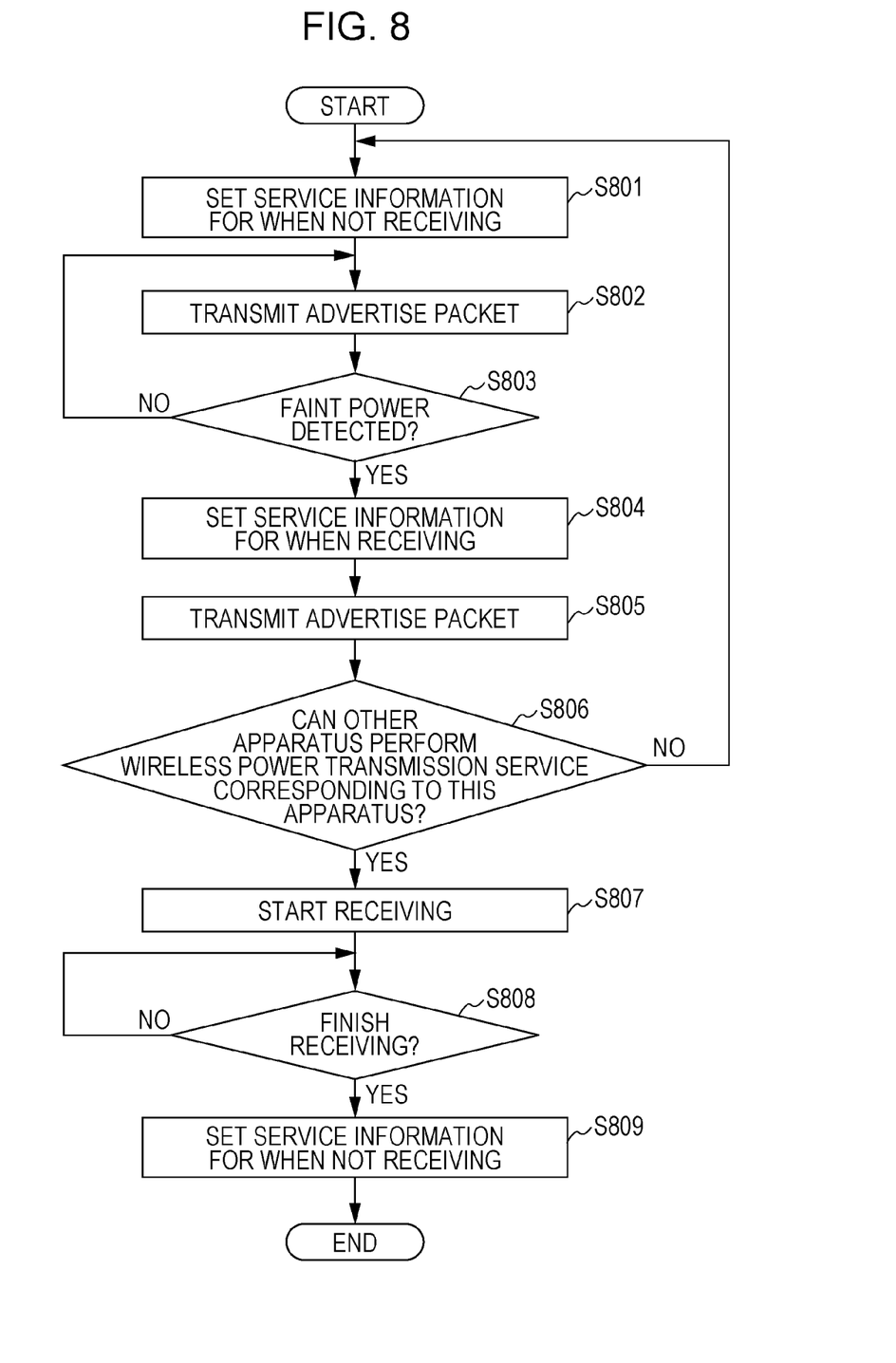
FIG. 8 illustrates operations of the camera according to the first embodiment.

The operations of the system having the above-described configuration will be described next. The operations of the camera 101 will be described with reference to the flowchart in FIG. 8. Note that the flowchart in FIG. 8 is carried out by the CPU included in the control unit 202 executing control programs stored in the memory included in the control unit 202. Upon the processing being started, the control unit 202 of the camera 101 confirms that the receiving unit 204 is not receiving power transmission from an external apparatus, and thereupon sets non-receiving service information in advertise data in S801. FIG. 6 illustrates advertise data where non-receiving service information has been set.

Reference numeral 601 in FIG. 6 denotes a region where the notification mode of advertise data is shown. In FIG. 6, "General Discoverable Mode" is input, indicating that this is a mode which notifies to all wireless devices. Reference numeral 602 denotes a region where transmission power at the time of advertise data being transmitted is shown; a transmission power value is input here. Reference numeral 603 denotes a region where service information of the camera 101 is input; a universally unique identifier (UUID), which is a service identifier, is input here. Here, a "non-complete list of 16-bit service UUIDS", indicating 16 bits out of the total of 128 bits of the entire UUID, is input.

FIG. 6 illustrates an example notifying three types of service information which the camera 101 has. These three input in FIG. 6 are "Link Loss", "Immediate Alert", and "Battery Service". The "Link Loss" service is a service of notifying that wireless connection by the wireless unit 201 has been lost due to poor signal quality, by settings made from another communication apparatus. "Immediate Alert" is a service where a warning display is made at the display unit 206 or the like in the case of having received an alert signal from an apparatus to which the wireless unit 201 is connected. "Battery Service" is a service to notify the remaining power of the battery of the self apparatus to an apparatus to which the wireless unit 201 is connected.

Reference numeral 604 in FIG. 6 denotes a region where a local name indicating the name of the camera 101 is input. Inputting all of this information to the advertising data 506 gives a maximum value of 32 bytes. Accordingly, no more service information can be added to the advertise packet, so even if the camera 101 can handle other services, notification cannot be made to that effect.

Figure 7:
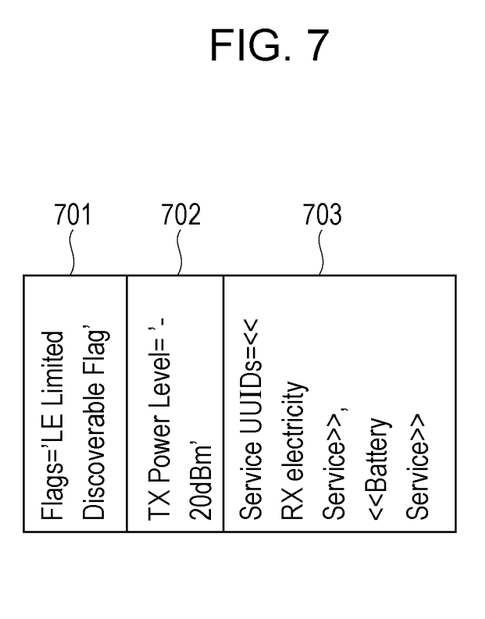
FIG. 7 illustrates the configuration of advertise data according to the first embodiment.

Returning to FIG. 8, the wireless unit 201 repeatedly and periodically performs broadcast transmission of the advertise packet, according to the information set in S801 (S802). Note that in the present embodiment, the wireless unit 201 repeatedly transmits the advertise packet at 1.28 second cycles, out of the selectable cycles according to the standard, taking into consideration power consumption and responsivity. The control unit 202 confirms whether or not faint power has been detected from the coil 203 by the receiving unit 204 (S803). The camera 101 recognizes that the self apparatus has been placed in a range where power transmission from the charging stand 102 can be made by detection of the faint power. If no faint power is detected, the advertise packet set in S801 is transmitted. Upon the receiving unit 204 detecting the faint power, the control unit 202 sets service data for when receiving in the advertise data (S804). Note that wireless power transmission service is included in the service data for when receiving. FIG. 7 illustrates advertise data where service data for when receiving has been set.

In FIG. 7, reference numeral 701 denotes a region indicating the notification mode of the advertise data. Limited Discoverable has been input in the case in FIG. 7, indicating that the mode is to notify only for a period of 30 seconds. Reference numeral 702 denotes a region indicating transmission power at the time of transmission of the advertise data; a transmission power value is input here. Reference numeral 703 denotes a region where service information which the camera 101 has is input; a UUID service identifier is input here. Here, a "non-complete list of 16-bit service UUIDS", indicating 16 bits out of the total of 128 bits of the entire UUID, is input.

FIG. 7 illustrates an example of notifying two types of service information which the camera 101 has. These two to be input are "RX Electricity" and "Battery Service". "RX Electricity" is a service where power is received by a predetermined wireless power transmission method. Thus, in a case where the camera 101 has been placed within a range capable of power transmission by the power transmission apparatus, and receives detection power transmitted wirelessly from the transmission apparatus, information is set in the advertise packet indicating compatibility with a service to receive power by the predetermined wireless power transmission method. Accordingly, information indicating compatibility with a service to receive power by the predetermined wireless power transmission method is not notified unless placed in a range where power can be transmitted from the power transmission apparatus, and instead, other communication apparatuses in the vicinity can be notified that the camera 101 is compatible with another service.

The wireless unit 201 performs periodic transmission of the advertise packet of which the service information has been changed to service information for when receiving, set in S804 (S805). The control unit 202 determines, for a predetermined time period, whether or not the other apparatus is capable of the wireless power transmission service with which the self apparatus is compatible (S806). This predetermined time period here is the 30 seconds over which the advertise packet in which the service information for when receiving has been set. Determination is made in S806 regarding whether or not information of a compatible wireless power transmission service is included in the advertise packet transmitted from the charging stand 102. In a case where there is no connection request by BLE from the charging stand 102, determination is made in S806 that the other apparatus is not capable of the wireless power transmission service with which the self apparatus is compatible. Alternatively the determination in S806 may be made according to whether or not there is information indicating the charging stand 102 is capable of the wireless power transmission service with which the self apparatus is compatible by BLE communication, after connection is made by BLE.

In a case where determination is made in S806 that the other apparatus is not capable of the wireless power transmission service with which the self apparatus is compatible, the flow returns to S801. On the other hand, in a case where determination is made in S806 that the other apparatus is capable of the wireless power transmission service with which the self apparatus is compatible, the receiving unit 204 starts power reception (S807). Alternatively, an arrangement may be made where the wireless unit 201 notifies the charging stand 102 of control information for performing wireless power transmission, such as requested power to be received, current remaining power in the battery, and so forth, before S807. Also, the wireless unit 201 may disconnect the BLE connection with the charging stand 102 after notifying the control information to perform wireless power transmission, and may connect only if there is need for communication of control information. Also, advertise packets in which service information for when receiving has been set may continue to be periodically transmitted during reception of power. The control unit 202 then determines whether or not to end reception (S808). For example, the control unit 202 determines to end reception in a case where the battery 205 is full and there is no more need to receive power. Also, in a case where transmission of power from the charging stand 102 stops, and reception of power cannot be detected any longer, the control unit 202 determines to end reception. In a case of determining to end reception, the control unit 202 sets service information for when not receiving in the advertise packet, in preparation for executing a service other than the wireless power transmission service, and the flow ends (S809). The camera 101 may transmit control information requesting stopping of the transmission to the transmission apparatus before ending reception of power, or alternatively, may repeat the flow from S801 instead of advancing to S809.

Thus, the operations of the camera 101 according to the present embodiment are arranged such that service information indicating compatibility with a wireless power transmission service is included in the advertise packet only in a case where the camera 101 is in the proximity of the charging stand 102 and can receive power. In a case where the camera 101 is placed at a position where power cannot be received from the charging stand 102, and there is little chance of executing the wireless power transmission service, apparatuses in the vicinity are notified of other service information instead. Thus, even though advertise packets are limited in the amount of data which can be input for service information, apparatuses in the vicinity can be notified of information relating to services which the camera 101 is more likely to execute, in accordance with the situation of the camera 101. Accordingly, the camera 101 can effectively notify apparatuses in the vicinity of information relating to services which is more likely to be executed in accordance with the situation, even with advertise packets which are limited in the amount of data.

Figure 9:
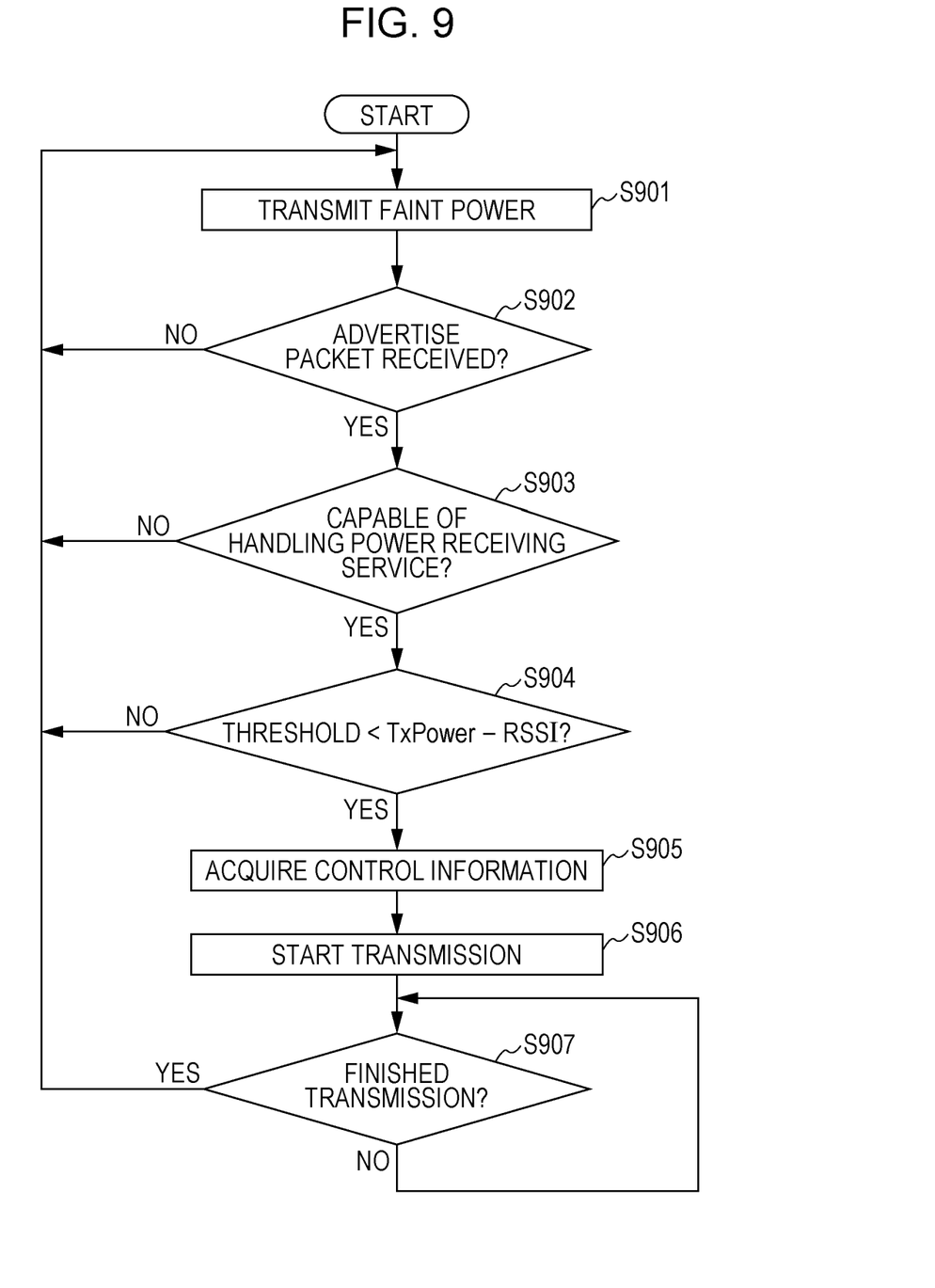
FIG. 9 illustrates operations of the charging stand according to the first embodiment.

Next, the operations of the charging stand 102 will be described with reference to the flowchart in FIG. 9. The power transmission unit 304 wirelessly transmits a faint power (e.g., 0.1 W) from the coil 303, as detection power which the power receiving apparatus uses to detect the charging stand 102 (S901). Next, the wireless unit 301 determines whether or not an advertise packet, transmitted from another communication apparatus, has been received. In a case of having received an advertise packet, determination is made regarding whether or not the other apparatus is compatible with the wireless power reception service, from the contents of the advertise data included in the advertise packet. If "RX Electricity" is described as a service in the advertise data, determination is made that the other apparatus is compatible with wireless power reception. In a case where determination is made that the other apparatus is not compatible with wireless power reception, the flow returns to S901. In a case where determination is made that the other apparatus is compatible with wireless power reception, determination is made regarding whether or not the apparatus which transmitted the advertise packet is placed on the charging stand 102. Whether or not the apparatus which transmitted the advertise packet is placed on the charging stand 102 is determined based on the transmission power value included in the received advertise data, and the reception signal intensity (RSSI) at the time of the wireless unit 301 having received the advertise packet.

In a case where the difference between the transmission power value included in the advertise packet and the reception signals intensity at the time of having received the advertise packet is smaller than a power threshold value of 30 dB, determination is made that this apparatus is placed on the charging stand 102. If the difference exceeds 30 dB, determination is made that there is a distance therebetween and that this apparatus is not placed on the charging stand 102 (S904).

In a case where the apparatus which has transmitted the advertise packet is not placed on the charging stand 102, the flow returns to S901. In a case where the apparatus which has transmitted the advertise packet is placed on the charging stand 102, the wireless unit 301 acquires control information from this apparatus, such as requested amount of electric power, remaining power in the battery, and so forth (S905). The power transmission unit 304 starts power transmission at a transmission power value (e.g., 10 W) based on the acquired control information (S906). The control unit 302 then determines whether or not to end transmission of power, and in a case of determining to end power transmission, the flow returns to S901.

Figure 4:
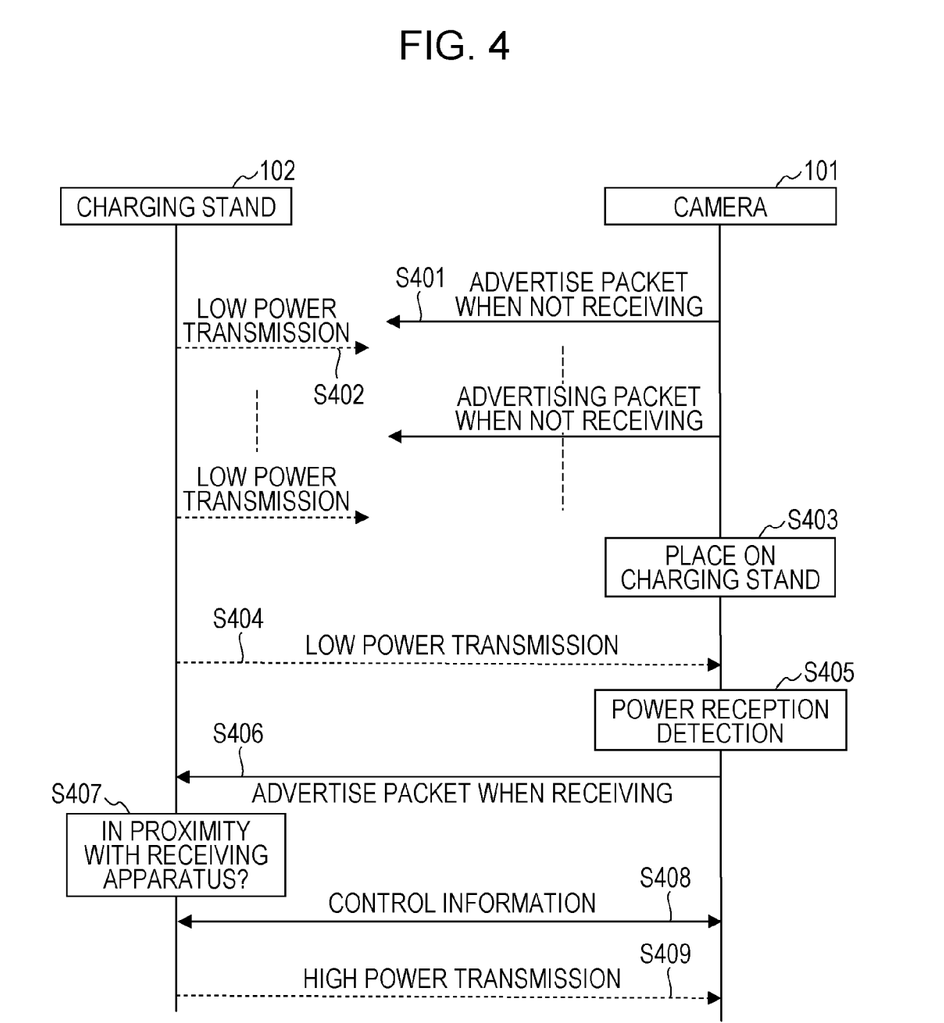
FIG. 4 illustrates a sequence according to the first embodiment.

Next, FIG. 4 illustrates an operation sequence between the camera 101 and charging stand 102. Upon starting processing, the camera 101 starts notification of an advertise packet in which service information when not receiving has been set. At the point in S401, the camera 101 is placed at a position where wireless power transmission cannot be performed from the charging stand 102, and there is a sufficient distance therebetween. The service information notified in S401 is that which is illustrated in FIG. 6.

Upon starting processing, the charging stand 102 confirms whether or not an advertise packet has been received, and starts transmission of feint power, which is used as detection power by the power receiving apparatus to detect the charging stand 102 (S402). The user then places the camera 101 on the charging stand 102, so that the camera 101 and the charging stand 102 are in a positional relation where wireless power transmission can be performed (S403). By being placed in a position where wireless power transmission can be performed from the charging stand 102, the camera 101 receives the faint power which the charging stand 102 transmits, at the receiving unit 204 (S404, S405). Upon detecting the faint power from the charging stand 102, the camera 101 switches to transmitting an advertise packet in which is set service information for when receiving (S406). The service information notified here is that which is illustrated in FIG. 7, and wireless power transmission service is input. Note that in a case where the remaining power in the battery 205 is zero, the advertise packet illustrated in FIG. 7 may be transmitted using the power received in S404, instead of performing transmission of advertise packet in S401.

Upon receiving an advertise packet including the wireless power transmission service from the camera 101, the charging stand 102 confirms whether the camera 101 which has transmitted the advertise packet is at a position where wireless power transmission can be performed (S407). Upon confirming that the camera 101 is at a position where wireless power transmission can be performed, the charging stand 102 connects to the camera 101, and performs communication with the camera 101 regarding control information for performing wireless power transmission (S408). The charging stand 102 then starts transmission of power to the camera 101 by high power transmission (S409).

As described above, the operations of the camera 101 according to the present embodiment are arranged such that only in a case where the camera 101 is in the proximity of the charging stand 102 and can receive power, does the camera 101 include service information indicating compatibility with the wireless power transmission service in the advertise packet. In a case where the camera 101 is placed at a position where power reception cannot be performed from the charging stand 102, and there is little chance that the wireless power transmission service will be executed, the camera 101 notifies apparatuses in the vicinity of other service information instead. Thus, even though advertise packets are limited in the amount of data which can be input for service information, apparatuses in the vicinity can be notified of information relating to services which the camera 101 is more likely to execute, in accordance with the situation of the camera 101. Accordingly, the camera 101 can effectively notify apparatuses in the vicinity of information relating to services which is more likely to be executed in accordance with the situation, even with advertise packets which are limited in the amount of data.

This enables more information of services of which the likelihood of being executed is higher to be notified to other apparatuses in the vicinity, as compared to always including the wireless power transmission service in the advertise packet. Another advantage of the present embodiment is that increase in advertise packet length can be prevented by changing the contents of the advertise packet only as necessary, thereby enabling battery life to be extended.

The communication apparatus (camera 101) according to the present embodiment includes a receiving unit which receives power wirelessly transmitted from another apparatus, and notifies service information including the wireless power transmission service by receiving power at the receiving unit (S406). In a case of not receiving power by the receiving unit, the communication apparatus according to the present embodiment notifies service information not including the wireless power transmission service (S401).

The communication apparatus according to the present embodiment switches from notifying service information not including the wireless power transmission service to service information including the wireless power transmission service, in accordance to power received at the receiving unit (S406). The communication apparatus according to the present embodiment switches from notifying service information not including the wireless power transmission service but rather including another service, to service information including the wireless power transmission service and not including another service, in accordance to power received at the receiving unit (S406).

Service information relating to the wireless power transmission service which the communication apparatus (camera 101) according to the present embodiment notifies includes information including a method of wireless power transmission (S406). The communication apparatus according to the present embodiment transmits control information for performing wireless power transmission to another apparatus which has received the notification of the service information including the wireless power transmission service. The communication apparatus according to the present embodiment receives, from another apparatus, transmitted power which has been increased by the other apparatus in accordance with reception of control information by the other apparatus.

In a case where power reception has ended, the communication apparatus according to the present embodiment switches from notification of service information including the wireless power transmission service to notification of service information not including the wireless power transmission service (S406). The communication apparatus according to the present embodiment stores (battery 205) the power received at the receiving unit. The communication apparatus according to the present embodiment performs notification of service information using the power received at the receiving unit.

Note that in the above-described embodiment, in a case where wireless power transmission is being performed in S409, the connection between the wireless units 201 and 301 of the camera 101 and charging stand 102 does not have to be maintained. An arrangement may be made where the wireless connection between the camera 101 and charging stand 102 is established only when necessary control information is to be communicated. Alternatively, communication of control information for performing wireless power transmission between the apparatuses may be included in an advertise packet.

Note that in a case where all services which the self apparatus is capable of executing can be input in the advertise data, for example, in service information when not receiving in S401, service information relating to wireless power transmission service may be included as well.

Description has been made in the above embodiment that after the camera 101 is placed on the charging stand 102, the content of the advertise data is changed by detection of power reception by the receiving unit 204. However, an arrangement may be made where, after the camera 101 is placed on the charging stand 102, the content of the advertise data is changed by the user pressing a button on the operating unit 207.

An arrangement may be made where in S407, type information of the standard for wireless power transmission may be included in the advertise data and notified, and wireless power transmission performed only in a case where the charging stand 102 is capable of wireless power transmission according to the standard.

Also, description has been made regarding an arrangement where one camera 101 is placed on the charging stand 102 in the present embodiment. Accordingly, an arrangement has been described where the charging stand 102 first transmits a faint power for power transmission detection at the camera 101. However, in a case of a power transmission apparatus capable of simultaneously transmitting power to multiple power receiving apparatus, a second power receiving apparatus will be placed on the power transmitting apparatus which the first power receiving apparatus is receiving power transmission. In such a case, the second power receiving apparatus may change the contents of the advertise data by detecting reception of the high power transmission in the power transmission detection.

Other Embodiments

In the above-described embodiment, information of the wireless power transmission service is input to the advertise packet in accordance with the power receiving apparatus receiving power transmitted from the power transmitting apparatus. However, an arrangement may be made where the content of the advertise packet is changed as described in the first embodiment in a case where the remaining power in the battery of the power receiving apparatus falls below a predetermined value (e.g., remaining battery power of 10%). Also, a configuration may be made where a message prompting charging of the power receiving apparatus is displayed at the power transmitting apparatus or the power receiving apparatus by way of the "Battery Service" of the power receiving apparatus, in a case where the remaining power in the battery of the power receiving apparatus falls below a predetermined value (e.g., remaining battery power of 10%).

Also, while an example has been described in the above embodiment where the power receiving apparatus is a camera, the power receiving apparatus may be an electronic apparatus other than a camera, such as a cellular phone, a personal digital assistant (PDA), a laptop computer, a printer, or the like.

Also, description has been made regarding an arrangement where the content of the advertise packet is changed notified in accordance with reception of power at the power receiving apparatus. However, an arrangement may be made where notification of the advertise packet is started in accordance with reception of power at the power receiving apparatus. This can reduce unnecessary advertise packets from being transmitted if the power receiving apparatus is an apparatus not capable of executing any service other than wireless power transmission. That is to say, the power receiving apparatus starts transmission of an advertise packet in which information is input to execute wireless power transmission, in a case where the power receiving apparatus and power transmitting apparatus are within a range where wireless power transmission can be performed. Also, transmission of an advertise packet in which information is input to execute wireless power transmission can be prevented in a case where wireless power transmission cannot be performed between the power receiving apparatus and the power transmitting apparatus.

The present disclosure also can be realized by performing processing where software (program) for realizing the functions of the above-described embodiments is supplied to a system or apparatus via network or any of various types of storage media, and a computer (or CPU or microprocessor unit (MPU)) of the system or apparatus reads out and executes the program.

According to the present disclosure, a communication apparatus can notify service information of a wireless power transmission service in accordance with reception of power.

Other Embodiments

Additional embodiments of the present invention can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-251391, filed Dec. 4, 2013, which is hereby incorporated by reference herein in its entirety.

What is claimed is:

1. A communication apparatus comprising:
an electric power reception unit configured to receive electric power wirelessly supplied from another apparatus;
a wireless unit configured to provide notification of capability information of the communication apparatus by wireless communication; and
a control unit configured to control the wireless unit to switch from providing notification of first capability information to providing notification of second capability information in accordance with reception of electric power by the electric power reception unit, the first capability information not including first service information but including second service information, the first service information indicating that a wireless power transmission service of receiving electric power supplied wirelessly is able to be executed, the second service information indicating that a service that is different from the wireless power transmission service is able to be executed, the second capability information including the first service information.

2. The communication apparatus according to claim 1, wherein in a case where the electric power reception unit is not receiving power, the wireless unit provides notification of the first capability information.

3. The communication apparatus according to claim 1, wherein the service indicated by the second service information is a service of notifying that wireless connection has been lost due to poor signal quality, a service where a warning display is made in a case of having received an alert signal from an apparatus to which the communication apparatus is connected, or a service for notification of remaining battery power of the communication apparatus to the apparatus to which the communication apparatus is connected.

4. The communication apparatus according to claim 1, wherein the second capability information does not include the second service information,
and wherein the wireless unit switches from providing notification of the first capability information to providing notification of the second capability information, in accordance with reception of electric power by the electric power reception unit.

5. The communication apparatus according to claim 1, wherein information indicating a method of wireless power transmission is included in the first service information.

6. The communication apparatus according to claim 1, wherein the wireless unit is configured to transmit, to the other apparatus which has received notification of the second capability information, control information for performing wireless power transmission, and
wherein the electric power reception unit wirelessly receives, from the other apparatus, transmission of power that has been increased by the other apparatus in accordance with reception of the control information by the other apparatus.

7. The communication apparatus according to claim 1, wherein the control unit is configured to, in a case where power reception by the electric power reception unit has ended, control the wireless unit to switch from providing notification of the second capability information to providing notification of the first capability information.

8. The communication apparatus according to claim 1, further comprising:
a storage unit configured to store electric power received by the electric power reception unit.

9. The communication apparatus according to claim 1, wherein the wireless unit provides notification of the first or second capability information using the electric power received by the electric power reception unit.

10. The communication apparatus according to claim 1, wherein the electric power reception unit receives electric power through electrogenesis based on an electromagnetic field from the other apparatus.

11. The communication apparatus according to claim 1, wherein the wireless unit provides notification of the first or second capability information using Bluetooth Low Energy.

12. The communication apparatus according to claim 1, wherein the wireless unit provides notification of the first or second capability information by an advertise packet using Bluetooth Low Energy.

13. A method for controlling a communication apparatus, the method comprising:
receiving electric power wirelessly supplied from another apparatus;
providing notification of capability information of the communication apparatus by wireless communication; and
switching from providing notification of first capability information to providing notification of second capability information in accordance with the reception of electric power, the first capability information not including first service information but including second service information, the first service information indicating that a wireless power transmission service of receiving electric power supplied wirelessly is able to be executed, the second service information indicating that a service that is different from the wireless power transmission service is able to be executed, the second capability information including the first service information.

14. A computer readable storage medium storing computer executable instructions that cause a computer to execute a method for controlling a communication apparatus, the method comprising:
receiving electric power wirelessly supplied from another apparatus;
providing notification of capability information of the communication apparatus by wireless communication; and
switching from providing notification of first capability information to providing notification of second capability information in accordance with the reception of electric power, the first capability information not including first service information but including second service information, the first service information indicating that a wireless power transmission service of receiving electric power supplied wirelessly is able to be executed, the second service information indicating that a service that is different from the wireless power transmission service is able to be executed, the second capability information including the first service information.

\* \* \* \* \*